(12) United States Patent  
Hendriks et al.

(10) Patent No.: US 11,904,710 B2  
(45) Date of Patent: Feb. 20, 2024

(54) BATTERY-POWERED VEHICLE HAVING STACKED BATTERY CELL ARRANGEMENT

(71) Applicant: Volvo Truck Corporation, Gothenburg (SE)

(72) Inventors: Jan Hendriks, Västra Frölunda (SE); Sondre Landvik, Gothenburg (SE); Jörgen Andersson, Landvetter (SE)

(73) Assignee: Volvo Truck Corporation, Gothenburg (SE)

( * ) Notice: Subject to any disclaimer, the term of this patent is extended or adjusted under 35 U.S.C. 154(b) by 129 days.

(21) Appl. No.: 17/368,119

(22) Filed: Jul. 6, 2021

(65) Prior Publication Data

US 2022/0009360 A1    Jan. 13, 2022

(30) Foreign Application Priority Data

Jul. 7, 2020 (EP) ..................................... 20184378

(51) Int. Cl.
*B60K 1/04* (2019.01)
*B60L 50/60* (2019.01)
(Continued)

(52) U.S. Cl.
CPC ................ *B60L 50/66* (2019.02); *B60K 1/04* (2013.01); *B60L 50/64* (2019.02); (Continued)

(58) Field of Classification Search
CPC ...... B60L 50/66; B60L 50/64; B60L 2200/18; B60K 1/04; B60K 2001/0405; H01M 50/204; H01M 2220/20; B60Y 2200/14
See application file for complete search history.

(56) References Cited

U.S. PATENT DOCUMENTS

| | | | |
|---|---|---|---|
| 6,059,058 A * | 5/2000 | Dower .................... | B60L 50/52 180/65.265 |
| 2005/0089751 A1* | 4/2005 | Oogami .............. | H01M 50/507 429/162 |

(Continued)

FOREIGN PATENT DOCUMENTS

| | | |
|---|---|---|
| CN | 102442190 A | 5/2012 |
| CN | 109941085 A | 6/2019 |

(Continued)

OTHER PUBLICATIONS

Extended European Search Report for European Patent Application No. 20184378.6, dated Dec. 2, 2020, 8 pages.

*Primary Examiner* — Jason D Shanske
*Assistant Examiner* — James J Triggs
(74) *Attorney, Agent, or Firm* — Withrow & Terranova, PLLC (57) ABSTRACT

The invention relates to a battery-powered vehicle comprising a chassis extending between the rear end and the front end of the vehicle. The chassis comprises an upper frame plate and a lower frame plate, wherein the lower frame plate is located vertically below the upper frame plate. The battery-powered vehicle further comprises a battery stack, which comprises a plurality of traction battery packs stacked on top of each other between the upper and lower frame plates, wherein each traction battery pack is vertically tightened to a neighboring traction battery pack and wherein at least one traction battery pack is tightened to one of said upper and lower frame plates.

16 Claims, 4 Drawing Sheets

(51) Int. Cl.
  *B60L 50/64* (2019.01)
  *H01M 50/204* (2021.01)

(52) U.S. Cl.
  CPC ... *H01M 50/204* (2021.01); *B60K 2001/0405* (2013.01); *B60L 2200/18* (2013.01); *B60Y 2200/14* (2013.01); *H01M 2220/20* (2013.01)

(56) References Cited

U.S. PATENT DOCUMENTS

| | | |
|---|---|---|
| 2007/0012496 A1 | 1/2007 | Chene et al. |
| 2012/0055724 A1* | 3/2012 | Iwasa ................. B60L 53/11 180/68.5 |
| 2014/0315069 A1* | 10/2014 | Kim ................. H01M 50/24 429/149 |
| 2020/0198476 A1 | 6/2020 | Janzen et al. |

FOREIGN PATENT DOCUMENTS

| | | |
|---|---|---|
| EP | 2339664 A1 | 6/2011 |
| EP | 3291330 A1 | 3/2018 |

\* cited by examiner

BATTERY-POWERED VEHICLE HAVING STACKED BATTERY CELL ARRANGEMENT

RELATED APPLICATIONS

The present application claims priority to European Patent Application No. 20184378.9, filed on Jul. 7, 2020, and entitled "A VEHICLE," which is incorporated herein by reference in its entirety.

TECHNICAL FIELD

The invention relates to a vehicle, in particular a battery-powered vehicle.

The vehicle may be a heavy-duty vehicle, such as a truck, a bus or a construction equipment. Although the invention will be described with respect to an truck, the invention is not restricted to this particular vehicle, but may also be used in other vehicles such as passenger cars.

BACKGROUND

Electric vehicles are provided with electric motors which are powered by one or more traction batteries. To provide sufficient energy, i.e. driving range, a large number of battery cells are needed. The number of cells may be hundreds or even thousands of cells, for example depending on the total energy (driving range) desired for the particular vehicle. To safely and efficiently manage the large number of battery cells mounted in an electric vehicle, the battery cells are installed in forms of battery modules. A cluster of cells make up a module. The modules thus protect the cells from external shocks, heat or vibration, etc. In their turn a cluster of module can be united in a traction battery pack. In addition to holding several battery modules, a traction battery pack may also comprise cooling components and electric wiring, etc. Thus, when producing a vehicle, one or more traction battery packs will be installed into (or mounted onto) the vehicle.

On trucks, traction battery packs are normally suspended onto the chassis with multiple brackets and are connected to each other with a multitude of cables and connectors. The traction battery packs on trucks may be formed like cubes, suspended form a frame of the chassis. This is an inefficient installation with regard to packaging since you need to hold the cube on the outside of the frame, thus requiring large brackets due to the bending moments. You also need to allow the frame to flex in normal movement, which is why each cube is suspended with bushings, which requires some free "lost" space for relative movement.

SUMMARY

An object of the invention is to provide a vehicle which alleviates at least partly some of the drawbacks of known electric vehicles. This is achieved by a vehicle according to claim 1.

The invention is based on the insight that by stacking a plurality of traction batteries packs between frame plates of the chassis and tightening the stack to such a frame plate, a space efficient installation may be obtained which does not require many cables and connectors, and which beneficially contributes to the rigidity of the chassis.

Thus, according to an aspect of the invention there is provided a vehicle, which comprises:
a rear end,
a front end located forwardly of the rear end, wherein a direction extending from the rear end towards the front end or vice versa is defined as a longitudinal direction of the vehicle,
a chassis extending between the rear end and the front end, the chassis comprising:
an upper frame plate having a length, width and thickness, wherein its length extends in the longitudinal direction and its thickness extends in a vertical direction, and
a lower frame plate having a length, width and thickness, wherein its length extends in the longitudinal direction and its thickness extends in the vertical direction,
wherein the lower frame plate is located vertically below the upper frame plate,
a battery stack comprising a plurality of traction battery packs stacked on top of each other between the upper and lower frame plates,
wherein each traction battery pack is vertically tightened to a neighbouring traction battery pack and wherein at least one traction battery pack is tightened to one of said upper and lower frame plates.

By the provision of a vehicle which comprises a stack of traction battery packs arranged between an upper and lower frame plates of a chassis, the advantage of a space-saving and efficient installation is obtainable, without compromising the structural rigidity of the chassis. Furthermore, by tightening the traction battery packs to each other, it is possible to avoid or at least reduce the number of brackets and joints that are needed in known electric vehicles.

Suitably, the uppermost traction battery pack and the lowermost traction battery pack of the stack may be tightened to the upper frame plate and lower frame plate, respectively. Thus, the stack of traction battery packs may suitably extend all the way from the lower frame plate to the upper frame plate, and suitably, the upper traction battery pack may be in tight contact with the upper frame plate and the lower traction battery pack may be in tight contact with the loser frame plate.

However, it should be understood that depending on individual requirements or requests, other configurations of the stack are conceivable. For instance, if a vehicle operator, owner, customer, etc. does not need as much battery energy as would be provided by a full stack of traction battery packs extending from the lower frame plate to the upper frame plate, it would be conceivable to provide fewer traction battery packs in the stack. Thus, the traction battery packs may be assembled into a stack having a desired voltage. For example, the lowermost traction battery pack may still be tightened to the lower frame plate, and each individual traction battery pack is still tightened to the neighbouring traction battery pack(s), i.e. to the traction battery pack of the stack arranged above and/or below said individual traction battery pack. However, at the top of the stack, to fill the space to the upper frame plate, the may be provided an insert, such as a dummy pack. The uppermost traction battery pack may thus be fastened to the insert, and the insert may be fastened to the upper frame plate. Naturally, the opposite arrangement is also conceivable, i.e. having an insert at the bottom of the stack, the insert being tightened to the lower frame plate, and the uppermost traction battery pack would be tightened to the upper frame plate. It should also be understood, that the tightening of the traction battery packs to each other and/or to the frame plates, may be achieved by relatively short fasteners connecting two components to each other, or by relatively long fasteners extending through several components, such as a fastener extending from the upper frame plate to the lower frame plate and thereby connecting and tightening all the traction battery packs in between the frame plates.

It should be understood that the vertical direction is perpendicular to the ground on which the vehicle stands. In other words, a vertical direction coincides or is parallel to the yaw axis of the vehicle. Thus, the fact that an individual traction battery pack is vertically tightened to a neighbouring traction battery pack means that it is tightened to a traction battery pack which is located above and/or below said individual traction battery pack. Thus, the uppermost traction battery pack of the stack is tightened to a neighbouring traction battery pack located below the uppermost traction battery pack, i.e. closer to the ground. The lowermost traction battery pack is tightened to a neighbouring traction battery pack located above the lowermost traction battery pack, i.e. further away from the ground. The remaining, intermediately located, traction battery pack(s) of the stack will be tightened to neighbours above and below.

It should also be understood that the longitudinal direction of the vehicle coincides or is parallel with the roll axis of the vehicle. The width or lateral direction of the vehicle coincides or is parallel with the pitch axis of the vehicle. As regards the dimensions of the upper frame plate and the lower frame plate it should be understood that the length is large than the width, and the width is larger than the thickness.

According to at least one exemplary embodiment, the battery stack has a length, a width and a height, wherein its height extends in the vertical direction and is smaller than each one of its length and its width. Thus, understandably, the length of the battery stack is larger than its widths, which in turn is larger than its height. This is advantageous as it may fit well between an upper frame plate and a lower frame plate of a vehicle chassis, without increasing the overall bulkiness of the chassis. The relatively low height allows for the stack to fit in between the upper and lower frame plates, while still providing large amount of stored energy, since the width and length of the stack enables a large number of battery cells to be provided and appropriately enclosed, even though the height of the stack is limited.

According to at least one exemplary embodiment, each traction battery pack is plate-shaped and has a length, a width and a thickness, wherein the thickness of each traction battery pack is smaller than its length and smaller than its width, wherein the thickness extends in the vertical direction, such that the battery stack comprises a stack of horizontal flat traction battery packs. Each traction battery pack may thus advantageously extend over a large area, and by stacking them on top of each other a relatively large volume is coverable, thus enabling a large amount of energy to be stored, and therefore a long driving range of the vehicle. The length of each traction battery pack will normally extend in the longitudinal direction of the vehicle, and the width of each traction battery pack will normally extend in the lateral direction of the vehicle. Each traction battery pack may suitably have a width which extends on both sides of the roll axis of the vehicle. Suitably, each traction battery pack may have a width which corresponds to the width of the upper and lower frame plates, or at least 80% of the width of the upper and lower frame plates, typically at least 90% thereof.

According to at least one exemplary embodiment, the thickness of each traction battery pack is in the range of 70-130 mm, such as 80-120 mm, typically 90-110 mm. An advantage of having such a flat traction battery pack is that the flat shape makes it easy to lay out components in the traction battery pack (such as cooling components, structural parts, connectors, battery cells/modules, etc.) and the assembly process may suitably be automated. The multiple flat traction battery packs may in the assembly process be stacked onto each other to reach the required energy level (kWh) for the customer request vehicle driving range (km).

According to at least one exemplary embodiment the tightening of the traction battery packs is achieved by means of fasteners. The fasteners may, for instance, comprise screws, bolts, or similar threaded or non-threaded components, suitably also including nuts and/or washers.

According to at least one exemplary embodiment, the vehicle comprises fasteners extending from the lower frame plate, through the bottom of the lowermost traction battery pack of the battery stack, whereby the lowermost traction battery pack is tightened to the lower frame plate. The fasteners may suitably be driven from the lower frame plate into (and possibly through) the lowermost traction battery pack, or they may be driven from the lowermost traction battery pack into the lower frame plate. The fasteners may be relatively short, such as only connecting the lowermost traction battery pack to the lower frame plate, or they may be longer extending to (or even through) one or more additional traction battery packs located on top of the lowermost traction battery pack.

Similarly, according to at least one exemplary embodiment, the vehicle comprises fasteners extending from the upper frame plate, through the top of the uppermost traction battery pack, whereby the uppermost traction battery pack is tightened to the upper frame plate. The fasteners may suitably be driven from the upper frame plate into (and possibly through) the uppermost traction battery pack, or they may be driven from the uppermost traction battery pack into the upper frame plate. The fasteners may be relatively short, such as only connecting the uppermost traction battery pack to the upper frame plate, or they may be longer extending to (or even through) one or more additional traction battery packs located underneath of the uppermost traction battery pack.

According to at least one exemplary embodiment, the battery stack comprises at least one traction battery pack located between the lowermost traction battery pack and the uppermost traction battery pack, wherein fasteners extend from said intermediate traction battery pack to the uppermost and/or lowermost traction battery pack.

According to at least one exemplary embodiment, the vehicle comprises fasteners extending all the way from the lower frame plate, through the battery stack, and to the upper frame plate. This may be advantageous since such a long fastener may provide a firm clamping of the battery stack between the upper and lower frame plates.

As explained in the background section of this disclosure, a plurality of battery cells may be provided in a common battery module, which protects the battery cells. A traction battery pack may comprise a plurality of such battery modules, and may also comprise additional features such as cooling components, electric wirings, etc. Such a modular structure is at least partly reflected in the following exemplary embodiments.

Thus, according to at least one exemplary embodiment, each traction battery pack may be provided with a reinforcement structure for receiving the fasteners used for tightening the traction battery pack to neighbouring traction battery packs and/or to the upper frame plate, and/or to the lower frame plate. The reinforcement structures may suitably be formed by a material goods portion into which (or even through which) the fasteners may be driven. The material goods portion may suitably be provided with a bore hole, such as a threaded bore hole, whereby a threaded portion of the fasteners may engage with the internal threads of the bore hole. However, it should be noted that the fasteners may be self-drilling, i.e. not needing any bore hole in the reinforcement structure, and/or they may be self-tapping, i.e. not needing any mating threads in any bore-hole through the reinforcement structure.

According to at least one exemplary embodiment, each traction battery pack comprises a tray in which a plurality of battery modules are provided, wherein the tray comprises reinforcement structures for receiving tightening fasteners extending from the upper frame plate, from the lower frame plate, and/or from another traction battery pack. An advantage of this is that the tray may have multiple functionality, such as functioning as a support/protection to the battery modules, and also functioning as a means for facilitating the tightening of the traction battery pack to the neighbouring traction battery pack.

According to at least one exemplary embodiment, said reinforcement structures comprise ribs extending across the tray and forming individual compartments for each battery module. Thus, the ribs may have the function of partition walls, suitably spaced from each other at a distance substantially corresponding to a dimension (such as a width) of an individual battery module. In addition to compartments for each battery module, the ribs may also form one or more compartments for auxiliary components such as cooling cables and electric wires, etc.

According to at least one exemplary embodiment, the battery stack forms together with the upper and lower frame plates, an integral load bearing structure of the chassis. This is advantageous, since a supporting wall, or the like, extending between the upper and lower frame plates may be omitted, and instead the battery stack provides the structural rigidity to the frame plates.

According to at least one exemplary embodiment, the vehicle further comprises:
 a power control unit,
 an electric motor, and
 a high voltage cable for transferring battery power from the power control unit to the electric motor,
wherein the battery stack is electrically connected to the power control unit, wherein the power control unit is located between the upper and lower frame plates.

By also providing the power control unit between the upper and lower frame plates, a compact installation is achievable. Long cables may be omitted. Suitably, the power control unit and the battery stack may be located close to each other, and suitably within a common outer casing. Thus, according to at least one exemplary embodiment, the power control unit is located within a casing which encloses the battery stack.

According to at least on exemplary embodiment, each traction battery pack of the battery stack is connected directly to the power control unit at a front or rear end of the casing. Thus, the power control unit may suitably be located in front of or behind the battery stack, as seen in the longitudinal direction of the vehicle. Accordingly, any connector of the battery stack may suitably be facing in the front or rear direction towards the power control unit, which enables a compact installation, without the need for many and long cables.

According to at least one exemplary embodiment, each traction battery pack of the battery stack are all connected to the power control unit by a common connector. This further provides for a compact and efficient installation. In other exemplary embodiments, each traction battery pack may have an individual respective connector to the power control module.

According to at least one exemplary embodiment, the common connector is provided on the lowermost traction battery pack of the battery stack, wherein the other traction battery packs are electrically connected to the lowermost traction battery pack of the battery stack. In such cases the lowermost traction battery pack may, for instance, be of a different dimension than the other traction battery packs. For instance, the lowermost traction battery pack may be larger in at least one direction, such as in the length direction of the vehicle. The power control unit may suitably be placed on top of the lowermost traction battery pack and the common connector.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
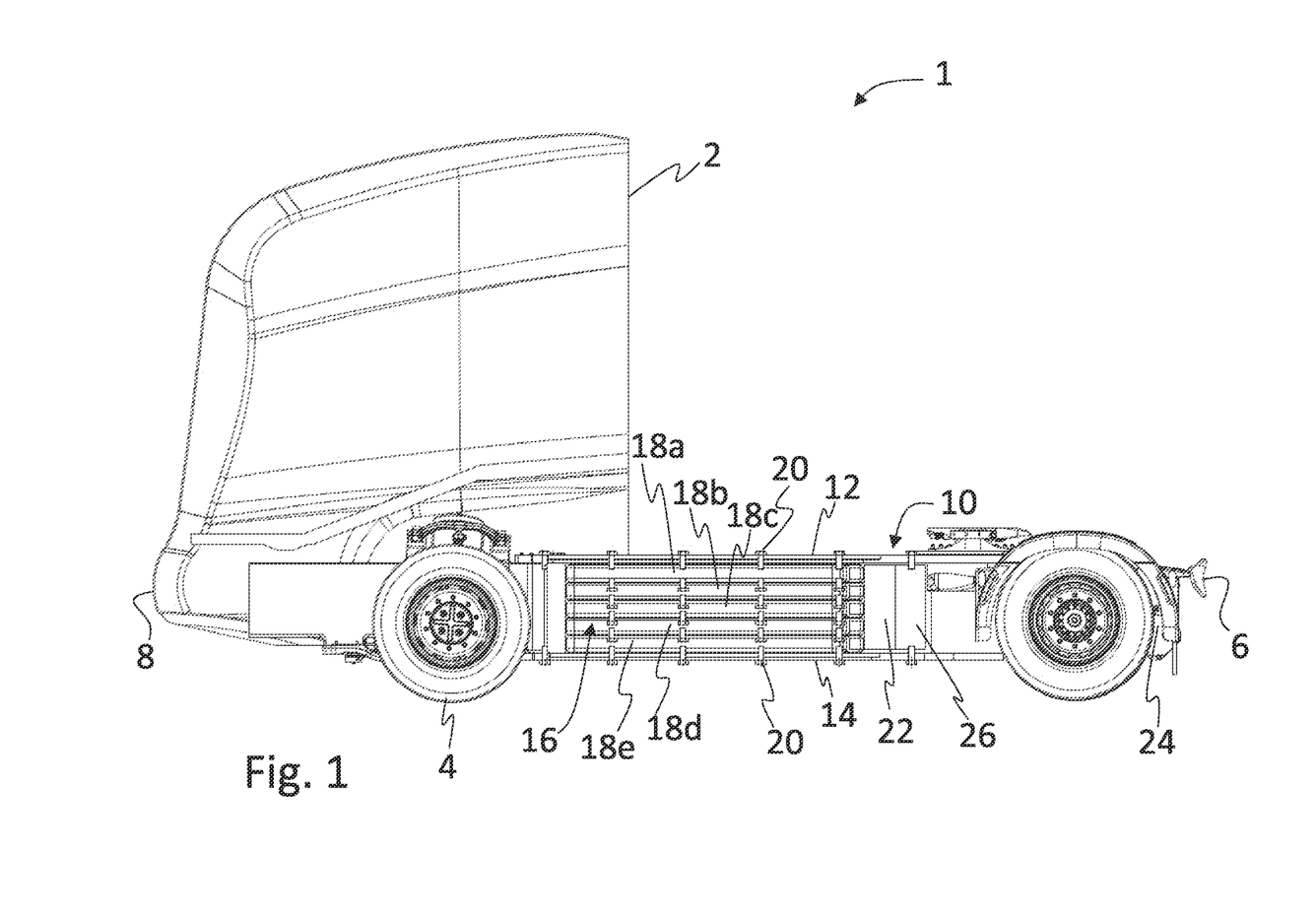
FIG. 1 is a schematic illustration of a vehicle according to at least one exemplary embodiment of the invention.

FIG. 1 is a schematic illustration of a vehicle 1 according to at least one exemplary embodiment of the invention. Although the vehicle 1 is illustrated in the form of a truck, other types of vehicles, such as busses, construction equipment or passenger cars may be provided in accordance with the invention.

The truck 1 (vehicle) comprises a cab 2 in which a driver may operate the vehicle 1. However, the invention may also be implemented in autonomous vehicles. The vehicle 1 comprises a number of road wheels 4, herein illustrated as two pairs of wheels, however in other embodiments there may be a different number of wheels, such as three pairs, four pairs or more.

The vehicle 1 has a rear end 6 and a front end 8 located forwardly of the rear end 6. A direction extending from the rear end 6 towards the front end 8, or vice versa, is defined as the longitudinal direction of the vehicle 1. A chassis 10 extends between the rear end 6 and the front end 8. The chassis 10 comprises an upper frame plate 12 and a lower frame plate 14 which is located vertically below the upper frame plate 12. Each one of the upper frame plate 12 and the lower frame plate 14 has a length, a width and a thickness. The length extends in the longitudinal direction of the vehicle 1. The thickness extends in the vertical direction.

The width extends in a direction perpendicular to both the longitudinal and the vertical directions, i.e. perpendicular to the plane of the drawing.

A battery stack 16 comprising a plurality of traction battery packs 18a-18e stacked on top of each other is provided between the upper frame plate 12 and the lower frame plate 14. Each traction battery pack 18a-18e is vertically tightened to a neighbouring traction battery pack. At least one of the traction battery packs 18a, 18e is tightened to one of the upper frame plate 12 and the lower frame plate 14. As seen in the cross-sectional view in FIG. 1, the uppermost traction battery pack 18a is tightened to the upper frame plate 12 by means of fasteners 20, such as screws or bolts. Likewise, the lowermost traction battery pack 18e is tightened to the lower frame plate 14 by means of fasteners 20. Each one of the intermediate traction battery packs 18b-18d (i.e. the traction battery packs 18b-18d located between the uppermost and lowermost traction battery packs 18a, 18e) is tightened to a neighbouring traction battery pack. Thus, the battery stack 16 forms a stack of interconnected/tightened traction battery packs 18a-18e. It may be noted that the uppermost traction battery pack 18a is, in addition to being tightened to the upper frame plate 12, also tightened by fasteners 20 to its below neighbouring traction battery pack 18b. Similarly, the lowermost traction battery pack 18e is, in addition to being tightened to the lower frame plate 14 also tightened by fasteners 20 to its above neighbouring traction battery pack 18d. Since the traction battery packs 18a-18e fill or substantially fill the vertical space between the upper and lower frame plates 12, 14, there is in this case no need for a filling insert between one of the traction battery packs and one of the upper and lower frame plates 12, 14. In other exemplary embodiments, however, for instance if less stored energy has been requested, one of more of the traction battery packs may be replaced by filling inserts. For example, instead of the uppermost traction battery pack 18a there may be a filling insert, likewise tightened to the upper frame plate 12 and the adjacent traction battery pack 18b.

Because the battery stack 16 fills up the space between the upper frame plate 12 and the lower frame plate 14, it provides support and rigidity to the chassis 10. Accordingly, the battery stack 16 forms, together with the upper and lower frame plates 12, 14, an integral load bearing structure of the chassis 10.

FIG. 1 also illustrates a power control unit 22 located rearwardly of the battery stack 16. Further rearwardly there is provided an electric motor 24 for propelling the vehicle 1. The battery stack 16 is electrically connected to the power control unit 22, which similarly to the battery stack 16 is located between the upper frame plate 12 and the lower frame plate 14. Battery power may be transferred from the power control unit 22 to the electric motor 24 via a high voltage cable. The power control unit 22 may suitably be located within a casing 26 which encloses the battery stack 16, thus, it may be a common casing 26 enclosing both.

In the exemplary embodiment of FIG. 1, a plurality of relatively short fasteners 20 are provided. Each fastener 20 is illustrated as connecting two parts, such as two traction battery packs 18a-18e, or a traction battery pack 18a, 18e and an upper or lower frame plate 12, 14. It should, however, be understood that longer fasteners may be provided which span over more than two parts, such as three parts or four parts, or even all of the parts from the upper to the lower frame plates 12, 14. The latter case is illustrated in FIG. 2.

Figure 2:
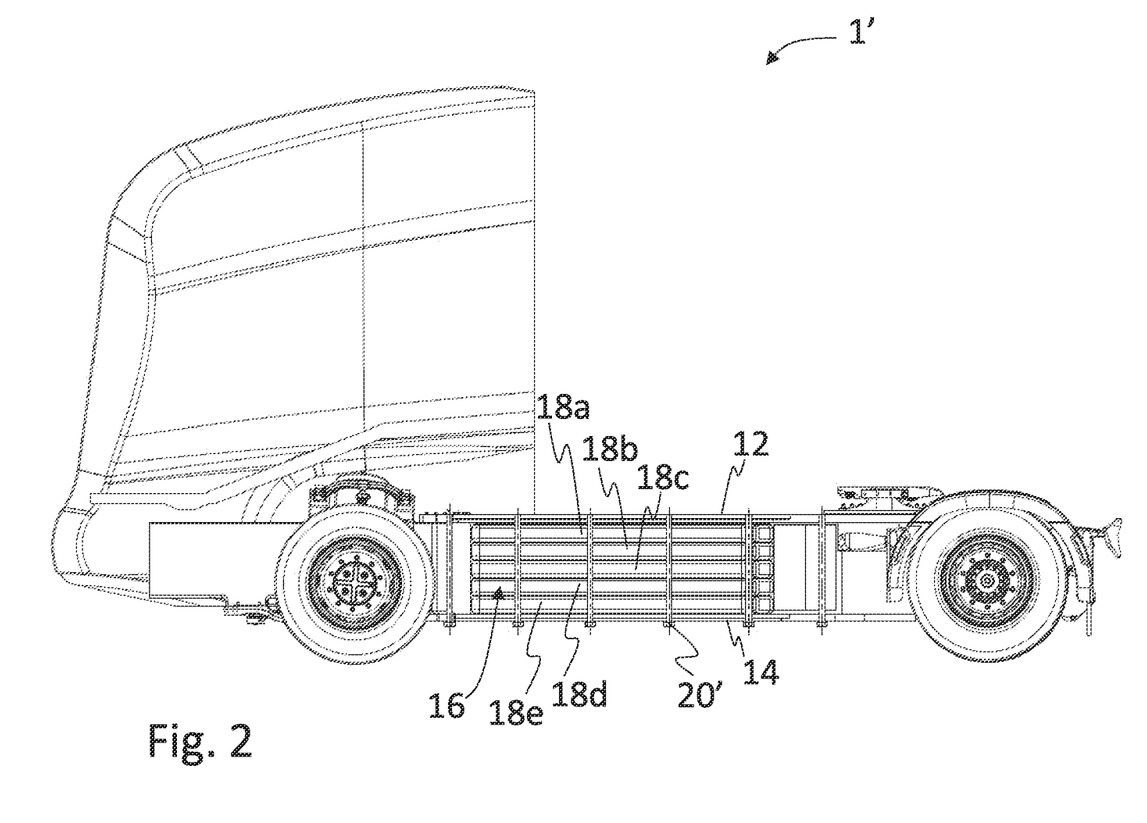
FIG. 2 is a schematic illustration of a vehicle according to at least one other exemplary embodiment of the invention.

Thus, turning to FIG. 2, there is provided a schematic illustration of a vehicle 1' according to at least one other exemplary embodiment of the invention. In this exemplary embodiment relative long fasteners 20' are provided. The fasteners 20' extend from the lower frame plate 14 through the traction battery packs of the battery stack 16 and all the way to the upper frame plate 12. Thus, the traction battery packs of the battery stack 16 become tightened to neighbouring traction battery packs, and the uppermost and lowermost traction battery packs become tightened to the upper and lower frame plates 12, 14, respectively. Put differently, the battery stack 16 as a whole is tightened to the upper frame plate 12 and the lower frame plate 14. Suitably, the battery stack 16 may be subjected to a clamping force from the upper and lower frame plates 12, 14 being tightened by the long fasteners 20'.

From the above, it is clear that in both exemplary embodiments of FIG. 1 and FIG. 2, there are fasteners 20, 20' extending from the lower frame plate 14, through the bottom of the lowermost traction battery pack 18e of the battery stack 16, whereby the lowermost traction battery pack 18e is tightened to the lower frame plate 14. Correspondingly, in both exemplary embodiments of FIG. 1 and FIG. 2, there are fasteners 20, 20' extending from the upper frame plate 12, through the top of the uppermost traction battery pack 18a, whereby the uppermost traction battery pack 18a is tightened to the upper frame plate 12. In this connection, it should be understood that in this disclosure terms such "extending from" and "extending to" do not imply any particular orientation of the fasteners. For instance, in case of a fastener being in the form of a screw having a screw head and a shaft, the screw head may be located at either one of the parts, be it the part from which the fastener is said to extend, or the part to which the fastener is said to extend. Thus, in the illustration in FIG. 2 although heads of the fasteners 20' are indicated as located at the lower frame plate 14, the fasteners 20' can still be said to extend from the upper frame plate 14 to the lower frame plate 12. Furthermore, it should be understood that the illustrated orientations in FIG. 1 and FIG. 2 are only exemplary, and one or more of the fasteners 20, 20' could instead be provided in the opposite orientation.

As illustrated in FIGS. 1 and 2, fasteners 20, 20' may also be used to fixate the casing 26 to the upper and lower frame plates 12, 14.

Figures 3, 4:
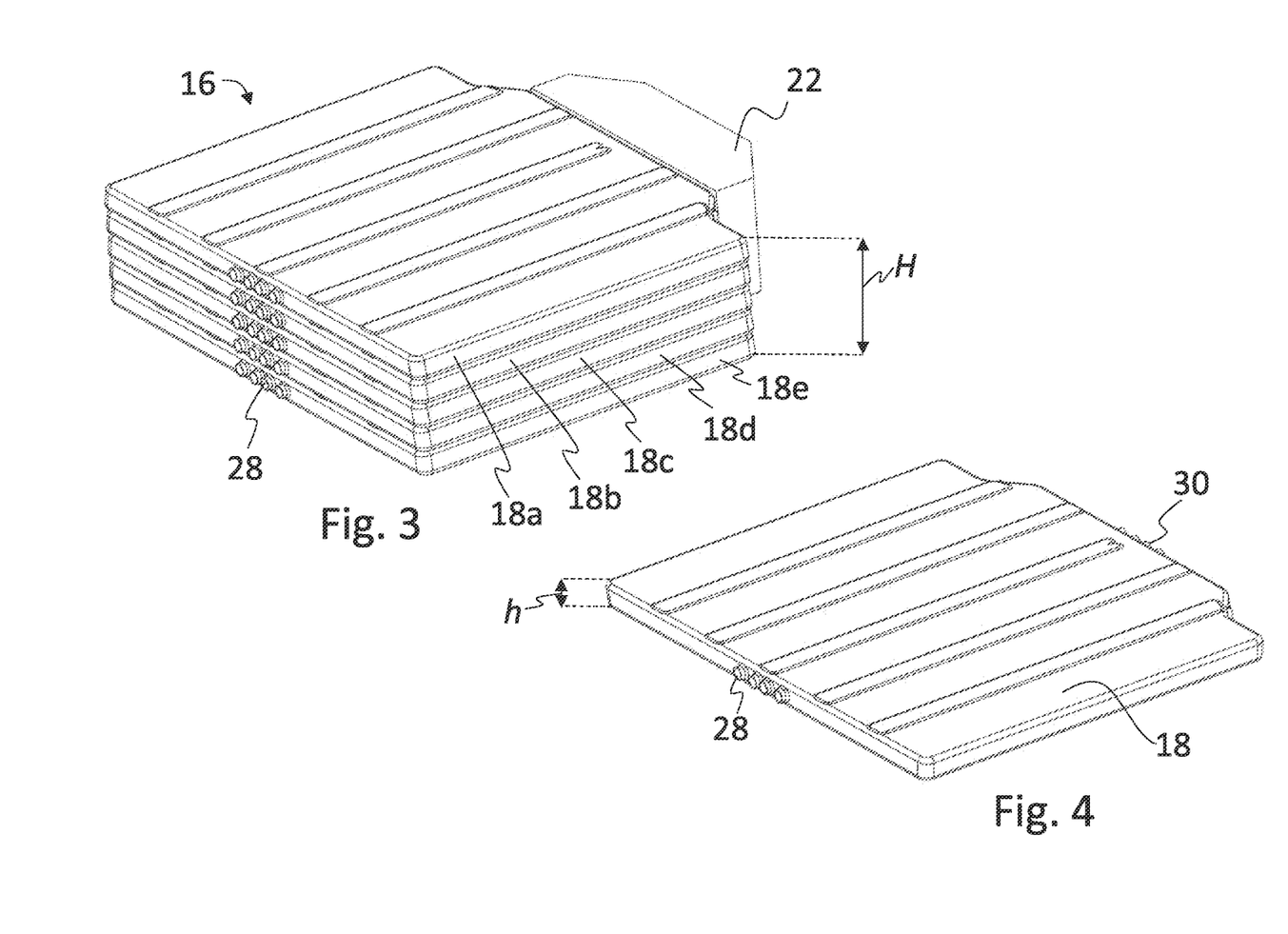
FIG. 3 is a schematic illustration of a battery stack connected to a power control unit, which may be provided on a vehicle in accordance with at least one exemplary embodiment of the invention.
FIG. 4 is a schematic illustration of a traction battery pack which may form part of the battery stack in FIG. 3.

FIG. 3 is a schematic illustration of a battery stack 16 connected to a power control unit 22, which may be provided on a vehicle in accordance with at least one exemplary embodiment of the invention. Thus, it may for example correspond to the battery stack 16 and power control module 22 illustrated in FIG. 1 and/or FIG. 2.

FIG. 4 is a schematic illustration of a traction battery pack 18 which may form part of the battery stack 16 in FIG. 3. Thus, the traction battery pack 18 in FIG. 4 may correspond to either one of the traction battery packs 18a-18e in FIGS. 1, 2 and/or 3, As can be seen in FIG. 3 and FIG. 4, each traction battery pack 18a-18e and 18 has a number of input areas 28 for receiving cooling cables, electric wires etc. In FIG. 4 it can be seen that on the opposite side of the traction battery pack 18 there is provided output areas 30 (similar output areas are present on the traction battery packs 18a-18e in FIG. 3, although not visible in the illustration). Such output areas 30 may include connectors for connecting each traction battery pack 18, 18a-18e of the battery stack 16 directly to the power control unit 22.

Thus, it should be understood that in some exemplary embodiments, each one of the traction battery packs 18a-18e in FIG. 3 will be individually connected to the power control unit 22. However, in other exemplary embodiment, the traction battery packs 18a-18e in FIG. 3 are all connected to the power control unit 22 by a common connector. For example, the common connector may be provided on the lowermost traction battery pack 18e, wherein the other traction battery packs 18a-18d are electrically connected to the lowermost traction battery pack 18e. Although not illustrated in FIG. 3, in some exemplary embodiments, the lowermost traction battery pack, being provided with said common connector, may extend beyond the other traction battery packs in the longitudinal direction, and the power control module may, for instance, be arranged on top of the extended portion of the lowermost traction battery pack.

The extension of the battery stack 18 in the vertical direction, is suitably smaller than in the longitudinal or lateral direction of the vehicle. This gives a less bulky impression than prior art cube-shaped battery solutions. Thus, the height H (may also be referred to as the thickness) of the battery stack 16 is smaller than each one of its length and its width. The maximum height H of the battery stack is limited to the distance between the upper and lower frame plates.

Furthermore, each individual traction battery pack 18, 18-18e may have a very small vertical extension. This is for instance indicated in FIG. 4. The height h (may also be referred to as the thickness) of the individual traction battery pack 18 is smaller than its length and its width. Indeed, the traction battery pack 18 may be substantially plate-shaped. Thus, the traction battery pack 18 may be considered as being a flat component. Thus, the battery stack 16 comprises a stack of horizontal flat traction battery packs 18a-18e. The height/thickness of each traction battery pack 18, 18a-18e may suitably be in the range of 70-130 mm, such as 80-120 mm, typically 90-110 mm.

Figures 5A, 5B, 5C:
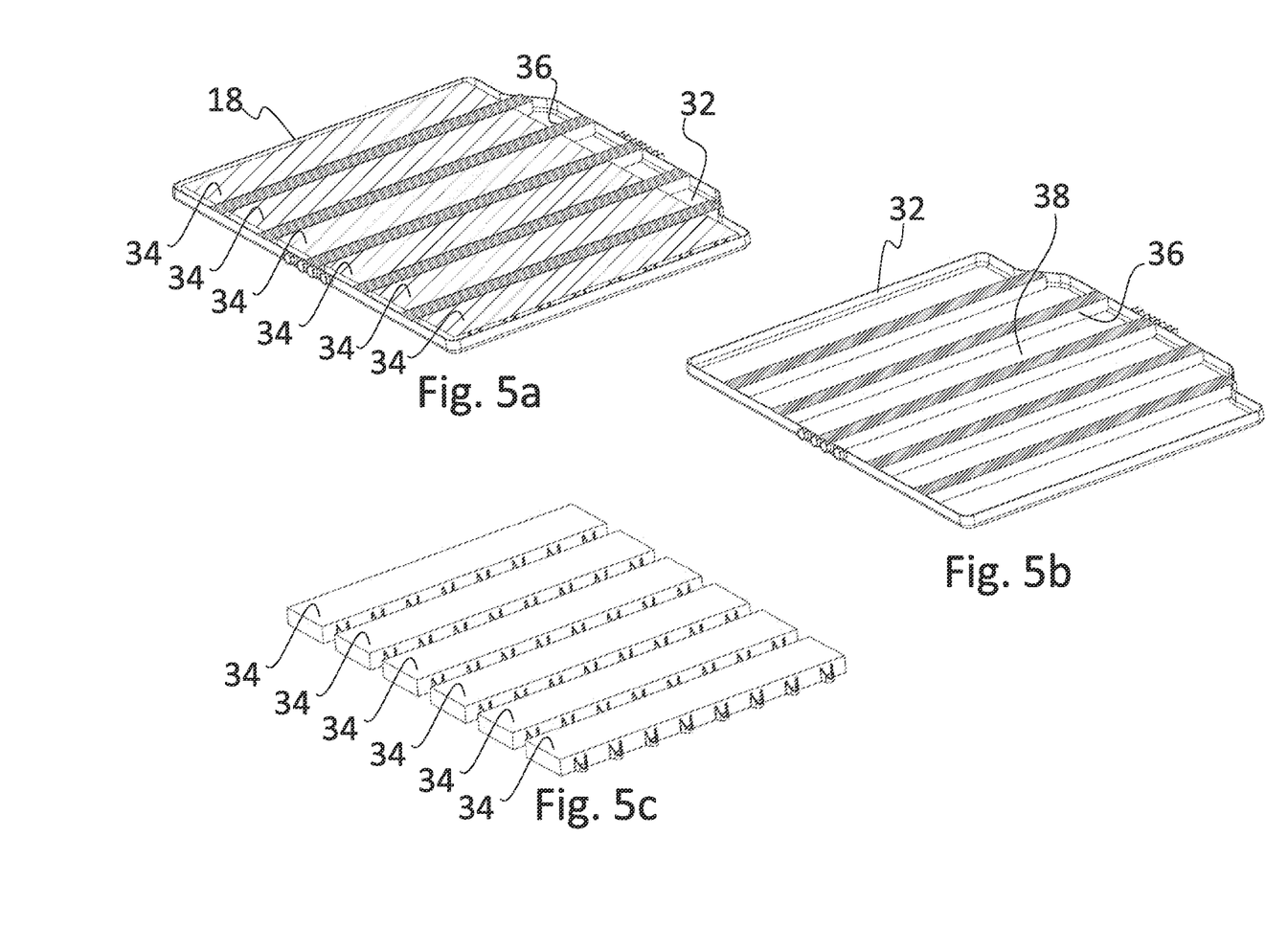
FIGS. 5a-5c schematically illustrate interior contents of a traction battery pack, such as the one in FIG. 4.

FIG. 5a-5c schematically illustrates interior contents of a traction battery pack 18, such as the one in FIG. 4.

Thus, FIG. 5a may illustrate a cross-sectional or cut-away view of the traction battery pack 18 of FIG. 4, wherein a top portion of the traction battery pack 18 in FIG. 4 has been cut away. FIG. 5a illustrates that the traction battery pack 18 comprises a tray 32 in which a plurality of battery modules 34 are provided. The tray 32 without the battery modules 34 is illustrated in FIG. 5b, while the actual battery modules 34 are illustrated in FIG. 5c.

As can be seen in FIG. 5a and FIG. 5b, the tray comprises reinforcement structures 36, here illustrated as ribs or partition walls. The reinforcement structures 36 may be formed in one piece with the main part of the tray 32, or as separate pieces which are connected to the tray, such as by welding, gluing or by mechanical fastening means. The reinforcement structures 36 can receive tightening fasteners, such as the previously discussed fasteners 20, 20' in FIGS. 1 and 2. Depending on the location of the specific traction battery pack 18 in the battery stack 16, such fasteners 20, 20' may tighten the traction battery pack 18 to the upper frame plate 12, to the lower frame plate 14, and/or to one or more other traction battery packs 18a-18e.

The reinforcement structures 36 extend across the tray 32 and form individual compartments 38 for each battery module 34. Accordingly, any fastener 20, 20' that penetrates into the traction battery pack 18, does in fact penetrate into a reinforcement structure 36, not into a battery module 34.

In the present illustration six compartments 38 are illustrated for receiving six battery modules 34. However, it should be understood that other number of compartments 38 and battery modules 34 are equally conceivable, be it a lower or a higher number. Similarly, it should be understood that although in the illustrated exemplary embodiments the number of traction battery packs 18a-18e in the battery stack 16 have been illustrated as five, other numbers are conceivable. For instance, other exemplary embodiments of the vehicle may have a shorter or longer vertical spacing between the upper and lower frame plates 12, 14, and accordingly the number of traction batteries in a battery stack 16 may be adapted accordingly, i.e. less or more than the illustrated five traction battery packs. The power module unit 22 may also be designed to fit in the space available in the chassis of the particular vehicle.

It is to be understood that the present invention is not limited to the embodiments described above and illustrated in the drawings; rather, the skilled person will recognize that many changes and modifications may be made within the scope of the appended claims.

The invention claimed is:

1. A vehicle, comprising:
a rear end,
a front end located forwardly of the rear end, wherein a direction extending from the rear end towards the front end is defined as a longitudinal direction of the vehicle,
a chassis extending between the rear end and the front end, the chassis comprising:
an upper frame plate having a length, width, and thickness, wherein the length of the upper frame plate extends in the longitudinal direction, and the thickness of the upper frame plate extends in a vertical direction, and
a lower frame plate having a length, width, and thickness, wherein the length of the lower frame plate extends in the longitudinal direction, and the thickness of the lower frame plate extends in the vertical direction,
wherein the lower frame plate is located vertically below the upper frame plate, and
a battery stack comprising a plurality of traction battery packs stacked on top of each other between the upper and lower frame plates,
wherein each traction battery pack is vertically fastened to a neighboring traction battery pack and wherein at least one traction battery pack is fastened to one of the upper and lower frame plates.

2. The vehicle of 1, wherein the battery stack has a length, a width, and a height, wherein the height of the battery stack extends in the vertical direction and is smaller than each one of the length and the width of the battery stack.

3. The vehicle of claim 1, wherein each traction battery pack is plate-shaped and has a length, a width, and a thickness, wherein the thickness of each traction battery pack is smaller than the length and smaller than the width of the traction battery pack, wherein the thickness extends in the vertical direction, such that the battery stack comprises a stack of horizontal flat traction battery packs.

4. The vehicle of claim 1, wherein the thickness of each traction battery pack is in a range of 70 mm to 130 mm.

5. The vehicle of claim 1, further comprising fasteners extending from the lower frame plate through the bottom of a lowermost traction battery pack of the battery stack, wherein the lowermost traction battery pack is fastened to the lower frame plate.

6. The vehicle of claim 1, further comprising fasteners extending from the upper frame plate through the top of an uppermost traction battery pack of the battery stack, wherein the uppermost traction battery pack is fastened to the upper frame plate.

7. The vehicle of claim 1, wherein the battery stack comprises at least one traction battery pack located between a lowermost traction battery pack and an uppermost traction battery pack of the battery stack, wherein fasteners extend from the at least one traction battery pack to the uppermost and/or lowermost traction battery pack.

8. The vehicle of claim 1, further comprising fasteners extending from the lower frame plate, through the battery stack, and to the upper frame plate.

9. The vehicle of claim 1, wherein each traction battery pack comprises a tray in which a plurality of battery modules is provided, wherein the tray comprises reinforcement structures for receiving tightening fasteners extending from the upper frame plate, from the lower frame plate, and/or from another traction battery pack.

10. The vehicle of claim 9, wherein the reinforcement structures comprise ribs extending across the tray and forming individual compartments for each battery module.

11. The vehicle of claim 1, wherein the battery stack forms together with the upper and lower frame plates, an integral load-bearing structure of the chassis.

12. The vehicle of claim 1, further comprising:
a power control unit,
an electric motor, and
a high voltage cable for transferring battery power from the power control unit to the electric motor,
wherein the battery stack is electrically connected to the power control unit, and wherein the power control unit is located between the upper and lower frame plates.

13. The vehicle of claim 12, wherein the power control unit is located within a casing that encloses the battery stack.

14. The vehicle of claim 13, wherein each traction battery pack of the battery stack is connected directly to the power control unit at a front or rear end of the casing.

15. The vehicle of claim 12, wherein all traction battery packs of the battery stack are all connected to the power control unit by a common connector.

16. The vehicle of claim 15, wherein the common connector is provided on the lowermost traction battery pack of the battery stack, wherein the other traction battery packs are electrically connected to the lowermost traction battery pack of the battery stack.

* * * * *